United States Patent Office 3,491,113
Patented Jan. 20, 1970

3,491,113
SULPHONYL UREA DERIVATIVES
Erhard Schenker, Basel, and Fulvio Gadient, Birsfelden, Switzerland, assignors to Sandoz Ltd. (also known as Sandoz A.G.), Basel, Switzerland
No Drawing. Filed Dec. 6, 1967, Ser. No. 688,310
Claims priority, application Switzerland, Dec. 13, 1966, 17,760/66; Apr. 21, 1967, 5,739/67
Int. Cl. C07d 27/04; A61k 27/00
U.S. Cl. 260—326.1                    12 Claims

ABSTRACT OF THE DISCLOSURE

The invention provides a compound of formula:

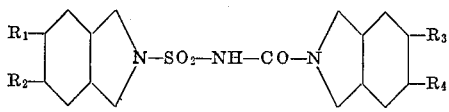

wherein each of $R_1$ and $R_2$ is hydrogen, or together they are a second bond, and each of $R_3$ and $R_4$ is hydrogen, or together they are a second bond, the two rings of the isoindole radicals being joined by a cis- or trans-linkage, and its pharmaceutically acceptable alkali metal, alkaline earth metal, and ammonium salts, and its salts with organic bases.

The compounds are useful in the treatment of diabetes mellitus and disorders in lipid metabolism.

---

The present invention relates to new heterocyclic sulphonyl-ureas and to a process for their production.

The present invention provides heterocyclic sulphonyl-urea derivatives of Formula I,

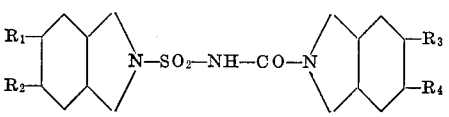

in which each of $R_1$ and $R_2$ signifies a hydrogen atom, or together $R_1$ and $R_2$ signify a second bond, and
each of $R_3$ and $R_4$ signifies a hydrogen atom, or together $R_3$ and $R_4$ signify a second bond,
the two rings of the isoindole radicals being joined by a cis- or trans-linkage, their alkali metal, alkaline earth metal and ammonium salts, and their salts with organic bases.

The present invention further provides a process for the production of compounds of Formula I, characterized in that a compound of Formula II,

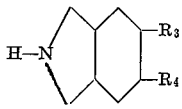

in which $R_3$ and $R_4$ have the above significance, is reacted with a compound of Formula III,

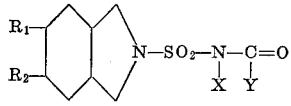

in which $R_1$ and $R_2$ have the above significance, and
either X and Y together signify a second bond between the carbon and the nitrogen atom,
or X signifies hydrogen and Y signifies a lower alkoxy radical;

or an amine of Formula II is reacted with a sulphonyl-urea derivative of Formula IV,

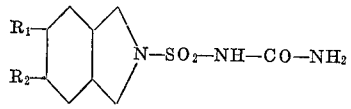

in which $R_1$ and $R_2$ have the above significance, in a lower carboxylic acid ester, or in an aromatic hydrocarbon in the presence of a lower aliphatic fatty acid; and in order to obtain a salt of the resulting compound, this is converted into its alkali metal, alkaline earth metal or ammonium salt or a salt with an organic base.

The process may, for example, be effected as follows, depending on the starting materials used:

A sulphonyl-isocyanate (Formula III: X and Y together=second bond) is dissolved in an anhydrous organic solvent, e.g. absolute benzene or toluene, and this solution is added during the course of a few minutes at room temperature to a compound of Formula II dissolved in more of the same solvent, following on which the reaction product usually starts to precipitate. After stirring at room temperature for two to three hours, the reaction product precipitates completely in crystalline form and is isolated and purified in manner known per se.

When sulphonyl-carbamic acid esters (Formula III: X=H, Y=alkoxy) are used as starting materials of Formula III, the process is effected by melting together the corresponding ester, either in free form with 2 mols of Compound II or in the form of a salt of Compound II with a further mol of Compound II, and keeping the mass in a melted condition for 10 minutes to half an hour, optionally at reduced pressure. The final product may be isolated by dissolving the reaction product in a suitable solvent, optionally shaking out the solution with an acid, whereupon the compound of Formula I is isolated and purified in manner known per se.

The reaction of a Compound II with a carbamic acid ester of Formula III may likewise be effected in an anhydrous organic solvent, e.g. absolute benzene, toluene, xylene, dimethyl formamide or acetonitrile. The solution is maintained at the boil under reflux for 5 to 24 hours. After cooling, the solution is shaken out with a dilute mineral acid in order to split an additional compound of Compound I with the amine of Formula II which may be formed, whereupon the desired final product is isolated and purified in manner known per se, e.g. by crystallization.

The reaction of the amine II with the urea derivative IV requires very specific reaction conditions. The reaction is effected by heating a mixture of the urea derivative and the heterocyclic amine of Formula II in a lower carboxylic acid ester, e.g. acetic acid ethyl ester or propionic acid ethyl ester, as solvent, at the boiling temperature of the solvent for 5 to 30 hours, preferably in an atmosphere of nitrogen.

The reaction proceeds well in an aromatic hydrocarbon, e.g. benzene, one of its homologues or mixtures of the same, when 1 to 1.2 mols of the amine of Formula II are used and the reaction is effected in the presence of 1 to 1.2 mols of a lower aliphatic fatty acid.

The invention also includes the production of salts of the resulting final products of Formula I, e.g. the lithium, sodium, potassium, calcium or ammonium salts, or physiologically tolerable salts with organic bases.

The sulphonyl-urea derivatives of the present invention are useful because they possess pharmacological activity in animals. In particular, the compounds are useful in the treatment of diabetes mellitus and disorders in lipid metabolism as is indicated by test carried out with dogs and rats. In these tests (titration method of V. P. Dole, J. Clin. Invest. 35, 150 (1956), and modified method of W. S. Hoffmann, J. Biol. Chem. 120, 51 (1937) employing the Technicon Autoanalyzer) the compounds are shown to exhibit a pronounced blood sugar lowering effect of long duration, even upon administration of low doses, and, also at low doses, the compounds furthermore lower the content of free fatty acids in the blood. The compounds are well tolerated and have a low toxicity which is perfectly acceptable at the dosages indicated below.

For the above-mentioned use, the dosage administered will, of course, vary depending upon the compound employed, mode of administration and treatment desired. However, in general satisfactory results are obtained when administered at a daily dosage of from about 0.5 milligram to about 50 milligrams per kilogram of animal body weight, preferably given in divided doses 1 to 3 times a day or in sustained release form. For the larger mammals, the total daily dosage is in the range of from about 50 milligrams to about 3000 milligrams, and dosage forms suitable for oral administration comprise from about 200 milligrams to about 500 milligrams of the compound admixed with a solid or liquid pharmaceutical carrier or diluent.

In order to produce suitable medicinal preparations the compounds are worked up with the usual inorganic or organic adjuvants which are inert and physiologically acceptable. Suitable medicinal preparations are, for example, tablets, dragées, capsules, syrups, injectable solutions. Aside from adjuvants, e.g. polyvinyl pyrrolidone, methyl cellulose, talcum, magnesium stearate, stearic acid and sorbic acid, the preparations may also contain suitable preserving agents, sweetening and colouring substances and flavourings.

The sulphonyl-isocyanates and sulphonyl-carbamic acids used as starting materials of Formula III are new compounds. They may be obtained from the likewise unknown sulphonamides of Formula V,

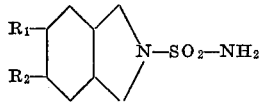

V in which $R_1$ and $R_2$ have the above significance.

The sulphonyl-isocyanates may be produced by heating the corresponding sulphonamide with phosgene in a suitable organic solvent, e.g. nitrobenzene, di- or tri-chlorobenzene, preferably 1,2,4-tri-chlorobenzene, to about 150–200° C., removing the solvent from the cooled reaction mixture by distillation and isolating and purifying the desired sulphonyl-isocyanate in manner known per se, e.g. by crystallization.

In accordance with a further embodiment of this process the reaction of the sulphonamide with phosgene may be effected in boiling chlorobenzene containing 10 to 20% of n-butyl-isocyanate for every mol of sulphonamide.

The sulphonyl-carbamic acid esters, e.g. the methyl or ethyl ester, are obtained by treating a sulphonamide with a chloroformic acid ester in a suitable organic solvent, e.g. acetone, in the presence of an alkaline condensation agent, e.g. sodium or potassium carbonate, at 40–70° C. for 5 to 18 hours. The compound which precipitates from the cooled reaction mixture is subsequently dissolved in water and the aqueous solution is acidified with a mineral acid, e.g. dilute hydrochloric acid, whereby the desired sulphonyl-carbamic acid ester precipitates, is isolated by filtration and subsequently purified, e.g. by crystallization.

The sulphonyl-ureas used as starting materials of Formula IV are also new compounds. They may also be obtained from the unknown sulphonamides of Formula V, in which $R_1$ and $R_2$ have the above significance, as follows:

The corresponding sulphonamide is heated in aqueous-alcoholic solution for several hours with an alkali cyanate, the precipitated alkali salt is subsequently filtered off from the cooled reaction mixture, is dissolved in a small amount of water, the aqueous solution is slightly acidified with a dilute mineral acid, e.g. dilute hydrochloric acid, and the sulphonyl-urea derivative is isolated therefrom in manner known per se.

The sulphonyl-ureas can also be obtained by heating the corresponding sulphonamide alkali salt and urea in a high-boiling solvent, e.g. benzyl alcohol, to 120–180° C. The desired urea compound precipitates by acidifying the cooled reaction solution.

The sulphonamides of Formula V may be produced by reacting amines of Formula VI,

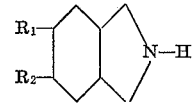

VI in which $R_1$ and $R_2$ have the above significance, and sulphamide. After heating the two reaction components in a suitable organic solvent, e.g. 1,2-dimethoxyethane, at about 100° C., the desired sulphonamides are obtained in manner known per se.

The sulphonamides may likewise be produced by reacting the amines of Formula VI with sulphuryl chloride and adding the resulting sulphamyl chlorides to concentrated ammonia, whereupon the sulphonamides may be isolated and purified in manner known per se.

The term "in manner known per se" as used herein designates methods in use or described in the literature on the subject.

In the following non-limitative examples all temperatures are indicated in degrees centigrade and are uncorrected.

EXAMPLE 1

N - (cis-octahydro-isoindole-2-sulphonyl) - cis-octahydro-isoindole-2-carboxamide 11.04 g. of cis-octahydro-isoindole-2-sulphonyl-carbamic acid ethyl ester and 10 g. of cis-octahydro-isoindole are mixed well and heated in an oil bath of 140° for 10 minutes. After cooling to room temperature the reaction mixture is taken up in 100 ml. of chloroform, the solution is shaken out with 2 N hydrochloric acid and water and dried over magnesium sulphate. After distilling off the solvent, the crystalline residue, i.e. the compound indicated in the heading, is recrystallized from diethyl ether/pentane. Melting point 100–102°.

The cis-octahydro-isoindole-2-sulphonyl-carbamic acid ethyl ester used as starting material is produced as follows:

(a) 2-sulphamoyl-cis-octahydro-isoindole.—12.5 g. of cis-octahydro-isoindole and 11.5 g. of sulphamide in 40 ml. of 1, 2-dimethoxyethane are heated in an oil bath of 100° for 2 hours. The solvent is subsequently distilled off completely in a vacuum, the residue is taken up in 150 ml. of benzene and the solution is shaken out once with 30 ml. of 2 N hydrochloric acid. The benzene extract is subsequently extracted thrice with 40 ml. each of 1 N sodium hydroxide solution, the combined aqueous portions are acidified with 5 N hydrochloric acid and extraction is then effected thrice with 100 ml. each of methylene chloride. After washing with water and drying over megnesium sulphate, the solvent is distilled off, whereupon 2-sulphamoyl-cis-octahydro-isoindole crystallizes. After recrystallizing from methylene chloride/pentane the compound has a melting point of 65–67°.

(b) Cis-octahydro-isoindole-2-sulphonyl-carbamic acid ethyl ester.— 18.6 g. of chloroformic acid ethyl ester are added dropwise during the course of 10 minutes to a mixture of 30 g. of 2-sulphamoyl-cis-octahydro-isoindole and 47 g. of potassium carbonate in 220 ml. of acetone and the mixture is subsequently heated to the boil while stirring for 18 hours. The crystalline precipitate is filtered off from the resulting reaction mixture and is washed with diethyl ether. The dry residue is dissolved in 450 ml. of water, the pH value of the alkaline solution is adjusted to 1 with 5 N hydrochloric acid, whereby the desired compound precipitates as an oil. This oil is shaken out with chloroform, the chloroform extract is washed with water and dried over magnesium sulphate. After removing the solvent, cis-octahydro-isoindole-2-sulfonyl-carbamic acid ethyl ester is obtained as an oil which cannot be distilled without decomposition.

EXAMPLE 2

N-(cis-octahydro-isoindole-2-sulphonyl)-cis-(2,3,3a,4,7,7a-hexahydro-1H-isoindole)-2-carboxamide 11.04 g. of cis-octahydro-isoindole-2-sulphonyl-carbamic acid ethyl ester and 4.92 g. of cis-2,3,3a,4,7,7a-hexahydro-1H-isoindole (melting point of the hydrochloride: 128°) are mixed well and heated in an oil bath of 140° for 40 minutes. After cooling to room temperature, the reaction mixture is taken up in 100 ml. of chloroform, the solution is shaken out with 2 N hydrochloric acid and water and dried over magnesium sulphate. After distilling off the solvent, the crystalline residue, i.e. the compound indicated in the heading, is recrystallized from diethyl ether. Melting point 110–112°.

EXAMPLE 3

N-[cis-(2,3,3a,4,7,7a - hexahydro - 1H - isoindole)-2-sulphenyl] - cis-(2,3,3a,4,7,7a - hexahydro-1H-isoindole)-2-carboxamide 5.48 g. of cis-2,3,3a,4,7,7a-hexahydro-1H-isoindole-2-sulphonyl-carbamic acid ethyl ester and 4.92 g. of cis-2,3,3a,4,7,7a,-hexahydro-1H-isoindole are mixed well and heated in an oil bath of 140° for 15 minutes. After cooling to room temperature, the reaction mixture is taken up in 100 ml. of chloroform, the solution is shaken out with 2 N hydrochloric acid and water and dried over magnesium sulphate. After distilling off the solvent, the oily residue is taken up in 100 ml. of ethanol, is treated with animal charcoal, filtered and the filtrate is completely concentrated. The crystalline residue, i.e. the compound indicated in the heading, is recrystallized from chloroform/diethyl ether. Melting point 107–109°.

The cis-2,3,3a,4,7,7a-hexahydro-1H-isoindole - 2 - sulphonyl acid ethyl ester used as starting material is produced as follows:

(a) 2-sulphamoyl-cis-2,3,3a,4,7,7a-hexahydro - 1H-isoindole.—12.3 g. of cis-2,3,3a,4,7,7a-hexahydro-1H-isoindole (melting point of the hydrochloride 128°) and 11.5 g. of sulphamide in 40 ml. of 1,2-dimethoxyethane are heated in an oil bath of 100° for 4¾ hours. The solvent is subsequently completely distilled off in a vacuum, the residue is taken up in 150 ml. of benzene and the solution is shaken out once with 30 ml. of 2 N hydrochloric acid. The benzene solution is subsequently extracted thrice with 40 ml. each of 1 N sodium hydroxide solution, the combined aqueous portions are acidified with 5 N hydrochloric acid and extraction is then effected thrice with 100 ml. each of methylene chloride. After washing with water and drying over magnesium sulphate the solvent is distilled off, whereupon 2-sulphamoyl-cis-2,3,3a,4,7,7a-hexahydro - 1H-isoindole crystallizes. After recrystallizing from chloroform/pentane, the compound has a melting point of 69–70°.

(b) Cis-2,3,3a,4,7,7a-hexahydro-1H-isoindole-2-sulphonyl-carbamic acid ethyl ester.—14.4 g. of chloroformic acid ethyl ester are added dropwise during the course of 10 minutes to a mixture of 20.2 g. of 2-sulphamoyl-cis-2,3,3a,4,7,7a-hexahydro-1H-isoindole and 35.8 g. of potassium carbonate in 150 ml. of acetone and the mixture is subsequently heated to the boil while stirring for 18 hours. The crystalline precipitate is filtered off from the cooled reaction mixture and washed with diethyl ether. The dry residue is dissolved in 400 ml. of water, the pH value of the alkaline solution is adjusted to 1 with 5 N hydrochloric acid, whereby the desired compound precipitates as an oil. This oil is shaken out with chloroform, the chloroform extract is washed with water and dried over magnesium sulphate. After removing the solvent, cis - 2,3,3a,4,7,7a - hexahydro - 1H-isoindole-2-sulphonyl-carbamic acid ethyl ester is obtained as a viscous oil.

EXAMPLE 4

N-[cis-(2,3,3a,4,7,7a-hexahydro-1H-isoindole)-2-sulphonyl]-cis-octahydro-isoindole-2-carboxamide 2.74 g. of cis-2,3,3a,4,7,7a-hexahydro-1H-isoindole-2-sulphonyl-carbamic acid ethyl ester and 2.5 g. of cis-octahydro-isoindole (melting point of the hydrochloride 121–123°) are mixed well and heated in an oil bath of 140° for 30 minutes. After cooling to room temperature the reaction mixture is taken up in 50 ml. of chloroform, the solution is shaken out with 2 N hydrochloric acid and water and dried over magnesium sulphate. After distilling off the solvent, the oily residue is taken up in 50 ml. of ethanol, is treated with animal charcoal, filtered and the filtrate is completely concentrated. The crystalline residue, i.e. the compound indicated in the heading, is recrystallized from diethyl ether/pentane. Melting point 84–87°.

EXAMPLE 5

N-(trans-octahydro-isoindole-2-sulphonyl)-cis-octahydro-isoindole-2-carboxamide 9.0 g. of trans-octahydro-isoindole - 2 - sulphonyl-carbamic acid ethyl ester and 8.2 g. of cis-octahydro-isoindole are mixed well and heated to 140° in an oil bath for 10 minutes. After cooling to room temperature the reaction mixture is taken up in 100 ml. of chloroform, the solution is shaken out with 2 N hydrochloric acid and water and dried over magnesium sulphate. After distilling off the solvent the oily residue is dissolved in 50 ml. of diethyl ether, whereby the compound indicated in the heading crystallizes. After recrystallizing from chloroform/diethyl ether the compound has a melting point of 155–157°.

The trans - octahydro - isoindole-2-sulphonyl-carbamic acid ethyl ester used as starting material is produced as follows:

(a) 2-sulphamoyl-trans-octahydro-isoindole.—16.2 g. of trans-octahydro-isoindole hydrochloride (melting point 175–177°) and 11.5 g. of sulphamide in 100 ml. of absolute pyridine are heated in an oil bath of 120° for 3½ hours. The solvent is subsequently completely distilled off in a vacuum, the residue is taken up in 150 ml. of chloroform and shaken out thrice with 50 ml. each of 2 N sodium hydroxide solution. The pH value of the aqueous extract is adjusted to 1 with 5 N hydrochloric acid and extraction is effected thrice with 100 ml. each of chloroform. After washing with water and drying over magnesium sulphate the solvent is distilled off and the crystalline residue, i.e. 2 - sulphamoyl - trans-octahydro-isoindole, is recrystallized from chloroform/diethyl ether. Melting point 122–124°.

(b) Trans - octahydro - isoindole-2-sulphonyl-carbamic acid ethyl ester.—12.4 g. of chloroformic acid ethyl ester are added dropwise during the course of 10 minutes to a mixture of 20 g. of 2-sulphamoyl-trans-octahydro-isoindole and 31 g. of potassium carbonate in 345 ml. of acetone and the mixture is subsequently heated to the boil while stirring for 18 hours. The crystalline precipitate is filtered off from the cooled reaction mixture and washed with diethyl ether. The dry residue is dissolved in 300 ml. of water, the pH value of the alkaline solution is adjusted to 1 with 5 N hydrochloric acid, whereby the desired compound precipitates as an oil. This oil is shaken out with chloroform, the chloroform extract is washed with water and dried over magnesium sulphate. After removing the solvent, trans-octahydro-isoindole-2-sulphonyl-carbamic acid ethyl ester is obtained as an oil.

EXAMPLE 6

N-(trans-octahydro-isoindole-2-sulphonyl)-trans-octahydro-isoindole-2-carboxamide 8.2 g. of trans-octahydro-isoindole - 2 - sulphonyl-carbamic acid ethyl ester and 7.4 g. of trans-octahydro-isoindole are mixed well and heated in an oil bath of 140° for 15 minutes. Working up is effected in a manner analogous to that described in Example 5. Melting point 97–99° (from diethyl ether).

EXAMPLE 7

N-(cis-octahydro-isoindole-2-sulphonyl)-cis-octahydro-isoindole-2-carboxamide 2.47 g. of cis-octahydro-isoindole-2-sulphonyl-urea and 1.6 g. of cis-octahydro-isoindole in 20 ml. of ethyl acetate are heated to the boil for 2 hours. The solvent is subsequently completely distilled off in a vacuum, the oily residue is taken up in 50 ml. of diethyl ether and the ether solution is shaken out with 2 N hydrochloric acid and water. After drying with magnesium sulphate, the solvent is completely distilled off, the oily residue is dissolved in 30 ml. of ethanol, is purified with animal charcoal, filtered and the solution is completely concentrated in a vacuum. The purified oily residue, i.e. the compound indicated in the heading, is dissolved in 20 ml. of diethyl ether, a small amount of pentane is added, whereby the compound crystallizes. Melting point 100–102°.

The cis-octahydro-isoindole-2-sulphonyl-urea used as starting material is produced as follows:

10.2 g. of 2-sulphamoyl-cis-octahydro-isoindole and 5.6 g. of potassium cyanate in 90 ml. of ethanol are heated to the boil at reflux for 5½ hours. After cooling in an ice bath, the crystalline precipitate is filtered off, dissolved in 80 ml. of water, the pH value of the aqueous solution is adjusted to 4 with 2 N hydrochloric acid, whereby cis-octahydro-isoindole-2-sulphonyl-urea precipitates in crystalline form. After washing with water and drying in an exsiccator over calcium chloride, the compound has a melting point of 176–181°.

EXAMPLE 8

N-[cis-(2,3,3a,4,7,7a-hexahydro-1H-isoindole)-2-sulphonyl]-cis-octahydro-isoindole-2-carboxamide 8.5 g. of cis-(2,3,3a,4,7,7a-hexahydro-1H-isoindole)-2-sulphonyl-urea and 4.4 g. of cis-octahydro-isoindole in 50 ml. of ethyl acetate are heated to the boil for 20 hours. The solvent is subsequently completely distilled off in a vacuum, the oily residue is taken up in 200 ml. of diethyl ether and the ether solution is shaken out with 2 N hydrochloric acid and water. After drying with sodium sulphate the solvent is completely distilled off, whereby a semi-crystalline residue is obtained. This residue is recrystallized from diethyl ether/pentane. Melting point 84–87°.

The cis-(2,3,3a,4,7,7a-hexahydro-1H - isoindole) - 2-sulphonyl-urea used as starting material is produced as follows:

A suspension of 101.1 g. of 2 - sulphamoyl - cis-2,3,3a,4,7,7a-hexahydro-1H-isoindole and 56.5 g. of potassium cyanate in 500 ml. of absolute ethanol is heated to the boil at reflux for 24 hours. After cooling in an ice bath, the crystalline precipitate is filtered off, dissolved in one litre of water, the pH value of the aqueous solution is adjusted to 4 with concentrated hydrochloric acid, whereby cis-(2,3,3a,4,7,7a-hexahydro-1H - isoindole) - 2-sulphonyl-urea precipitates in crystalline form. After washing with water and drying, the crude product is recrystallized from absolute ethanol. Melting point 175–177° (decomposition).

EXAMPLE 9

N-[cis-(2,3,3a,4,7,7a-hexahydro-1H-isoindole)-2-sulphonyl]-cis-octahydro-isoindole-2-carboxamide A solution of 2.45 g. of cis-2,3,3a,4,7,7a-hexahydro-1H-isoindole-2-sulphonyl-urea and 1.5 g. of cis-octahydro-isoindole in 50 cc. of toluene to which 0.72 g. of glacial acetic acid have been added, is heated to the boil for 3 hours. The reaction mixture is subsequently concentrated in a vacuum to an oil, and this is distributed between 100 cc. of chloroform and 50 cc. of 2% aqueous hydrochloric acid. The chloroform part is rewashed with 50 cc. of water, dried with sodium sulphate and completely concentrated. The remaining oil is crystallized from diethyl ether/hexane. After recrystallizing once from diethyl ether/hexane, the compound has a M.P. of 84–87°.

EXAMPLE 10

N-(cis-octahydro-isoindole-2-sulphonyl)-cis-octahydro-isoindole-2-carboxamide

A mixture of 4.94 g. of cis-octahydro-isoindole-2-sulphonyl-urea and 3.0 g. of cis-octahydro-isoindole in 30 cc. of toluene to which 1.45 g. of glacial acetic acid have been added, is heated to the boil for 6 hours. The reaction mixture is concentrated in a vacuum to an oil, and this is dissolved in 200 cc. of diethyl ether. This ether solution is shaken out twice, each time with 50 cc. of 2 N hydrochloric acid, and then four times, each time with 50 cc. of water. The ether part is dried with sodium sulphate and concentrated in a vacuum to an oil. The first crystallization from diethyl ether/pentane yields some cis-octahydro-isoindole-2-sulphonyl-urea which has not reacted. From the filtrate which has again been concentrated to an oil, the compound indicated in the heading crystallizes from diethyl ether/pentane and has a M.P. of 100–102°.

What is claimed is:

1. A compound of formula:

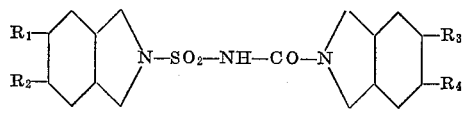

wherein each of $R_1$ and $R_2$ are hydrogen, or together they are a second bond, and each of $R_3$ and $R_4$ are hydrogen, or together they are a second bond, the two rings of the isoindole radicals being joined by a cis- or trans-linkage, or its pharmaceutically acceptable alkali metal, alkaline earth metal, and ammonium salts.

2. A compound according to claim 1, in which the compound is N-(cis-octahydro-isoindole-2-sulphonyl)-cis-octahydro-isoindole-2-carboxamide.

3. A compound according to claim 1, in which the compound is N-(cis-octahydro-isoindole-2-sulphonyl)-cis-(2,3,3a,4,7,7a-hexahydro-1H-isoindole)-2-carboxamide.

4. A compound according to claim 1, in which the compound is N-[cis-(2,3,3a,4,7,7a-hexahydro - 1H - isoindole) - 2 - sulphonyl]-cis-(2,3,3a,4,7,7a-hexahydro-1H-isoindole)-2-carboxamide.

5. A compound according to claim 1, in which the compound is N-[cis-(2,3,3a,4,7,7a-hexahydro - 1H - isoindole)-2-sulphonyl] - cis - octahydro-isoindole - 2 - carboxamide.

6. A compound according to claim 1, in which the compound is N-(trans-octahydro-isoindole-2-sulphonyl)-cis-octahydro-isoindole-2-carboxamide.

7. A compound according to claim 1, in which the compound is N-(trans-octahydro-isoindole-2-sulphonyl)-trans-octahydro-isoindole-2-carboxamide.

8. A compound according to claim 1, in which the compound is N-(cis-octahydro-isoindole - 2 - sulphonyl)-cis-octahydro-isoindole-2-carboxamide.

9. A compound according to claim 1, in which the compound is N-[cis-(2,3,3a,4,7,7a-hexahydro - 1H - isoindole)-2-sulphonyl] - cis - octahydro-isoindole - 2 - carboxamide.

10. A compound of formula:

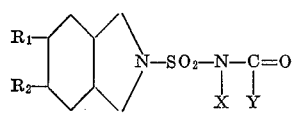

wherein $R_1$ and $R_2$ are hydrogen, or together they are a second bond, and either X and Y are together a second bond, or X is hydrogen and Y is lower alkoxy.

11. A compound of formula:

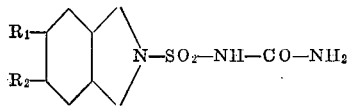

wherein $R_1$ and $R_2$ are hydrogen, or together they are a second bond.

12. A compound of formula:

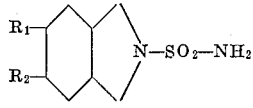

wherein $R_1$ and $R_2$ are hydrogen, or together they are a second bond.

References Cited

UNITED STATES PATENTS 3,064,006  11/1962  Novello _____ 260—326

ALEX MAZEL, Primary Examiner

J. A. NARCAVAGE, Assistant Examiner

U.S. Cl. X.R.

424—274